J. H. BANKA & J. WHALEN.
VEHICLE SPRING.
APPLICATION FILED OCT. 9, 1916.

1,216,922.

Patented Feb. 20, 1917.
2 SHEETS—SHEET 1.

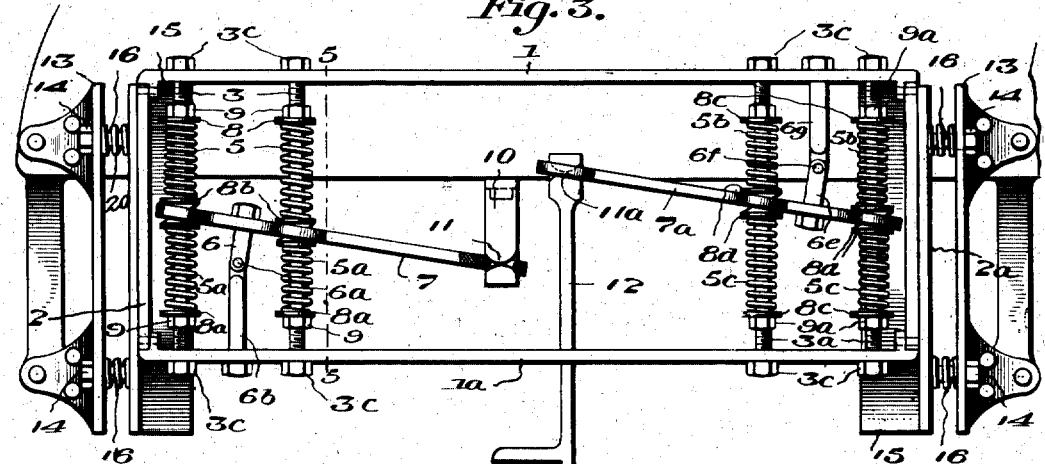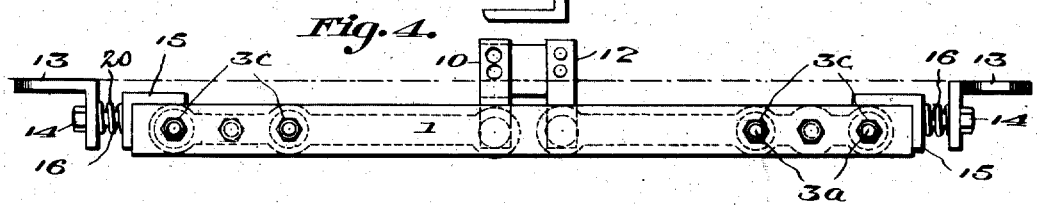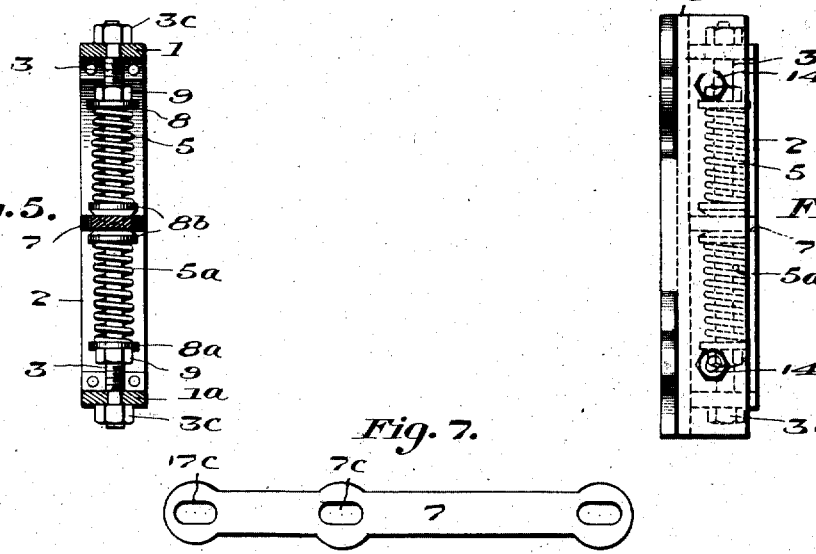

UNITED STATES PATENT OFFICE.

JOHN H. BANKA AND JOHN WHALEN, OF BATTLE CREEK, MICHIGAN.

VEHICLE-SPRING.

1,216,922.

Specification of Letters Patent.  Patented Feb. 20, 1917.

Application filed October 9, 1916. Serial No. 124,654.

*To all whom it may concern:*

Be it known that we, JOHN H. BANKA and JOHN WHALEN, citizens of the United States, residing at Battle Creek, in the county of Calhoun and State of Michigan, have invented certain new and useful Improvements in Vehicle-Springs; and we hereby declare that the following is a full, clear, and exact description thereof, reference being had to the accompanying drawings, which form part of this specification.

This invention is a novel improvement in springs particularly designed for use on automobiles but adaptable for use on other vehicles and other purposes in the arts where a yieldable cushioning spring is desired which will absorb and cushion shocks in an efficient manner.

The object of the invention is to provide a novel compound cushioning spring adapted to absorb jars and lessen shocks transmitted from the road to the vehicle body when applied to vehicles. A further object is to provide a spring which can be readily adjusted to suit different loads.

The invention consists in the novel combination, construction and arrangement of parts of the spring, hereinafter summarized in the claims, and the accompanying drawings illustrate one practical embodiment of the invention, and the following description of said embodiment will enable others skilled in the art to adopt and use the invention.

In said drawings—

Fig. 3 is a side elevation of the spring showing the displacement of spring elements under stress.

Fig. 4 is a top view of the spring showing guides to prevent longitudinal vibration thereof.

Fig. 5 is a sectional view of the spring on line 5—5 Fig. 3.

Fig. 6 is an end view of the spring and guide bracket.

Fig. 7 is a detail view of one of the levers.

Figure 1:
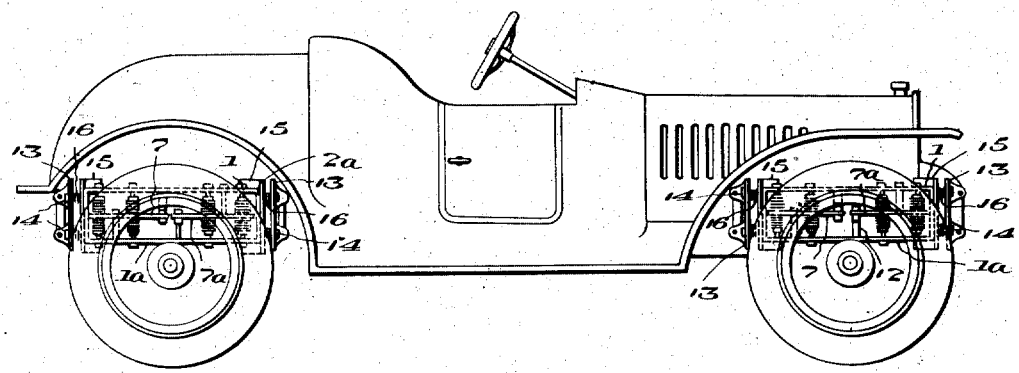
Figure 1 is a side elevation of an automobile provided with our novel spring.

Our spring, as we term it, consists of a combination of springs, levers, and frame arranged in a peculiar manner and adapted to operate as hereinafter pointed out.

As illustrated in the drawings the spring comprises preferably a rectangular frame composed of side bars 1, 1$^a$ and end bars 2, 2$^a$ which are rigidly connected to the ends of the side bars in any suitable manner so as to form a rigid rectangular frame.

Connected to and extending between the side bars 1, 1$^a$ near one end of the frame are a pair of parallel rods 3 which are preferably threaded and shouldered where they pass through the side bars 1 and may be rigidly fastened thereto by nuts 3$^c$ as indicated in the drawings. Adjacent the other end of the frame is a pair of similar rods 3$^a$ which are fastened to the side bars in a similar manner. On the rods 3 is strung a lever 7 which is provided with slots 7$^c$ for the passage of the rods 3 and which will permit the lever to be oscillated without binding on the rods.

The lever 7 is rigidly connected intermediate the rods to a member 6 which is in turn pivoted at 6$^a$ to a stud 6$^b$ rigidly attached to the side bar 1$^a$ and extending parallel with and between the rods 3. A lever 7$^a$ similar to lever 7 is strung on the rods 3$^a$ and is provided with a member 6$^e$ pivoted at 6$^f$ to a stud 6$^g$ rigidly attached to the side bar 1 intermediate the rod 3$^a$. It will be seen that the levers 7, 7$^a$ are fulcrumed on opposite sides of the frame.

The levers 7, 7$^a$ are normally held in position intermediate the side bars 1, 1$^a$ of the frame by means of suitable springs preferably strung on the rods 3, 3$^a$ and interposed between the levers and the sides of the frame. In the example shown helical springs are employed; such springs, 5, being shown as interposed between the lever 7 and the side bar 1, and helical spring 5$^a$ being strung on rod 3 between lever 7 and the side bar 1$^a$. Similar helical springs 5$^b$ are shown as strung on rods 3$^a$ intermediate the lever 7$^a$ and bar 1; and helical springs 5$^c$ are strung on rod 3$^a$ intermediate lever 7$^a$ and bar 1$^a$. The tension of these springs 5, 5$^a$ can be adjusted by means of nuts 9 strung on rod 3 between the side bars 1, 1$^a$; and the tension of springs 5$^b$, 5$^c$ can be adjusted by means of nuts 9$^a$ screwed on threaded rods 3$^a$ between the side bars 1, 1$^a$ and the springs.

Suitable washers 8, 8$^a$ can be interposed between the nuts 9 and the springs; and washers 8$^b$ can be interposed between the springs and lever 7. Similarly washers 8$^c$ can be interposed between nuts 9$^a$ and the springs; and washers 8ᵈ can be interposed between the springs and lever 7ᵃ.

Figure 2:
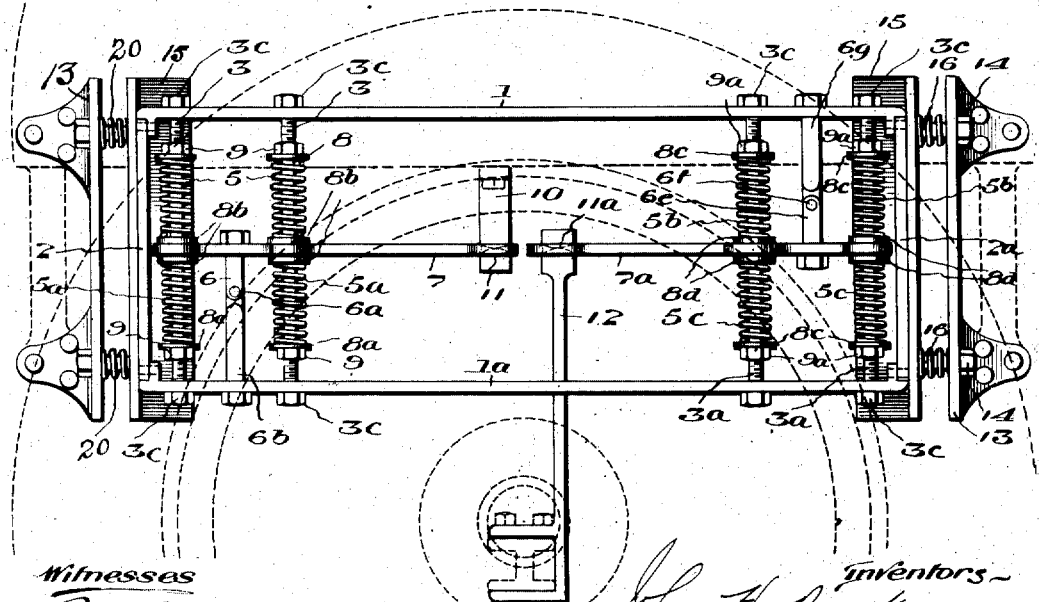
Fig. 2 is an enlarged view of one of the springs, as attached to a vehicle, showing the parts thereof in normal position.
Figure 2:

The levers 7, 7ᵃ extend toward the center of the frame and are normally in line, as indicated in Fig. 2; and one of these levers may be connected to one member, as the axle, of a vehicle and the other lever is connected to another member, as the body of the vehicle. In the example shown the lever 7 is connected in any suitable manner, preferably by a swivel joint indicated at 11 of any suitable kind, to a bracket 10 attached to the body of the vehicle; and the lever 7ᵃ may be similarly connected, as by a suitable rocking joint indicated at 11ᵃ, to a bracket or hanger 12 attached to the vehicle axle.

The action of the springs under stress is shown in Fig. 3. When the lever 7ᵃ receives a shock from the axle it moves upward and downward as indicated, flexing one of the lower coiled springs 5ᶜ and one of the upper coiled springs 5ᵇ, the return movement or oscillation of the lever 7ᵃ acting on the companion springs 5ᵇ, 5ᶜ. The connection of the body with the lever 7 produces the same action on the related springs.

It will be seen that the shock on the wheel or axle is first communicated through lever 7ᵃ to the related double set of springs on the frame, and transmitted, with a large part of the shock absorbed, through the lever 7 and its co-acting springs to the vehicle body. In this manner the shock is practically absorbed by the springs before it reaches the body, rendering the vehicle body very smooth riding. The opposed springs on each rod resist each other so that sudden collapse or recoil from shock is prevented.

The spring may if desired be yieldingly held in position relative to the vehicle or guided in its vertical movements by any suitable means, guides 15 being shown provided with studs 16 engaging openings in brackets 13 which can be attached to the vehicle body at a point adjacent the end of the springs; and helical springs 20 may be strung on the studs 16 between the brackets 13 and the guides 15 so as to cause guides 15 to yieldingly engage the ends of the frame and guide same, while assisting in holding it in normal working position. The springs 20 tend to resist endwise movement of the spring frame and do not interfere with the action of the springs proper.

The spring may be varied in size and strength according to the use for which it is desired, and changes may be made in the specific form thereof without departing from the essentials of the invention. The spring can be easily adjusted to suit any desired load by adjusting the bolts 9, 9ᵃ on the rods 3, 3ᵃ so as to compress or relax the springs. For example ordinarily an automobile designed for seven passengers, when used for only one or two is not as easy riding on account of the stiffness of the springs; but with our invention the tension of the springs can be readily relaxed by turning the nuts 9, 9ᵃ according to the load to be carried, and by properly adjusting the springs the car can be made to ride as smoothly for two passengers as for seven.

What we claim is:

1. A spring comprising a frame, a pair of oscillatory levers mounted therein, springs interposed between the levers and opposite sides of the frame at opposite sides of the fulcrums of the levers, the said levers being respectively adapted to be connected to a member to be supported and the support.

2. A spring comprising a retaining frame, a pair of oscillatory levers mounted therein, springs at opposite sides of the fulcrums of the levers and interposed between the opposite sides of the levers and the opposite sides of the frame, the said levers being respectively adapted to be connected to the member to be supported and a support.

3. In a vehicle spring the combination of a frame, an oscillatory lever mounted therein, springs arranged between opposite sides of said lever and opposite sides of the frame at opposite sides of the fulcrum of the lever.

4. In a vehicle spring the combination of a frame, an oscillatory lever mounted therein, springs arranged at opposite sides of the fulcrum of the lever and between opposite sides of said lever and the opposite sides of the frame, and means connecting the free end of said lever with an object to be supported.

5. In a vehicle spring the combination of a frame, a pair of oscillatory levers mounted therein, springs arranged at opposite sides of the fulcrums of the levers and between said levers and the sides of the frame, and means connecting the free ends of said levers respectively with an object to be supported and with the support, substantially as described.

6. A vehicle spring comprising a frame, levers fulcrumed in said frame, springs interposed between opposite sides of said levers and the sides of the frame, at opposite sides of the fulcrum of the levers, the free ends of said levers being respectively adapted to be connected to the object to be supported and to the support.

7. A spring comprising a frame, a lever fulcrumed on said frame, a pair of springs arranged at opposite sides of the fulcrum and interposed between opposite sides of the said lever and the opposite sides of the frame so that when the lever is oscillated one spring at each side thereof will be compressed while the opposed spring is relaxed.

8. A vehicle spring comprising a frame, a pair of rods mounted therein, a lever strung on said rods, a fulcrum supporting said lever intermediate the rods, and springs strung on the rods at opposite sides of the lever.

9. A vehicle spring comprising a frame, a pair of rods mounted therein, a lever strung on each pair of rods, a fulcrum supporting each lever intermediate its related rod, springs strung on the rods at opposite sides of the levers, and connections between the lever and the object to be supported and the other lever and the support.

10. A vehicle spring comprising a frame, a pair of rods mounted therein adjacent each end thereof, a lever strung on each pair of rods, a fulcrum supporting each lever intermediate the rods, a pair of springs strung on each of the rods at opposite sides of the lever, and connections between the free end of one lever and the object to be supported and the free end of the other lever and the support.

11. A spring comprising a frame, a pair of oscillatory levers mounted therein, springs interposed between the levers and frame at opposite sides of the fulcrums of the levers, the said levers being respectively adapted to be connected to a member to be supported and the support; with means for adjusting the tension of the springs to vary the strength of the spring as a whole.

12. A vehicle spring comprising a frame, a pair of rods mounted therein, a lever strung on said rods, a fulcrum supporting said lever intermediate the rods, and springs strung on the rods at opposite sides of the lever; with means for adjusting the tension of the springs to vary the strength of the spring as a whole.

13. A vehicle spring comprising a frame, a pair of rods mounted therein adjacent each end thereof, a lever strung on each pair of rods, a fulcrum supporting each lever intermediate the rods, a pair of springs strung on each of the rods at opposite sides of the lever, and connections between the free end of one lever and the object to be supported and the free end of the other lever and the support; with means for adjusting the tension of each of the said springs to vary the strength of the spring as a whole.

14. A spring comprising a frame, a pair of oscillatory levers mounted therein, springs interposed between the levers and frame at opposite sides of the fulcrums of the levers, the said levers being respectively adapted to be connected to a member to be supported and the support; with guides for preventing longitudinal displacement of the frame.

15. In a vehicle spring the combination of a frame, a pair of oscillatory levers mounted therein, springs arranged at opposite sides of the fulcrums of the levers and between said levers and the sides of the frame, and means connecting the free ends of said levers respectively with an object to be supported and with the support; with guides for preventing longitudinal displacement of the frame.

16. A vehicle spring comprising a frame, a pair of rods mounted therein adjacent each end thereof, a lever strung on each pair of rods, a fulcrum supporting each lever intermediate the rods, a pair of springs strung on each of the rods at opposite sides of the lever, and connections between the free end of one lever and the object to be supported and the free end of the other lever and the support; with guides for preventing longitudinal displacement of the frame.

In testimony that we claim the foregoing as our own we affix our signatures.

JOHN H. BANKA.
JOHN WHALEN.

Copies of this patent may be obtained for five cents each, by addressing the "Commissioner of Patents, Washington, D. C."